(12) United States Patent
Chen et al.

(10) Patent No.: US 10,079,114 B2
(45) Date of Patent: Sep. 18, 2018

(54) STACKED-TYPE SOLID ELECTROLYTIC CAPACITOR CAPABLE OF INCREASING WELDING EFFECT AND MANUFACTURING METHOD OF THE SAME

(71) Applicant: APAQ TECHNOLOGY CO., LTD., Miaoli County (TW)

(72) Inventors: Ming-Tsung Chen, Changhua County (TW); Chien-Wei Lin, Miaoli County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 25 days.

(21) Appl. No.: 15/242,512

(22) Filed: Aug. 20, 2016

(65) Prior Publication Data
US 2017/0338049 A1    Nov. 23, 2017

(30) Foreign Application Priority Data
May 20, 2016 (TW) .............................. 105115726 A

(51) Int. Cl.
| | |
|---|---|
| H01G 9/15 | (2006.01) |
| H01G 9/048 | (2006.01) |
| H01G 9/00 | (2006.01) |
| H01G 9/012 | (2006.01) |
| H01G 9/14 | (2006.01) |
| H01G 9/26 | (2006.01) |
| H01G 2/12 | (2006.01) |

(52) U.S. Cl.
CPC .......... *H01G 9/048* (2013.01); *H01G 9/0029* (2013.01); *H01G 9/012* (2013.01); *H01G 9/14* (2013.01); *H01G 9/15* (2013.01); *H01G 9/26* (2013.01); *H01G 2/12* (2013.01)

(58) Field of Classification Search
CPC ....................................................... H01G 9/012
USPC ....................................................... 361/541
See application file for complete search history.

(56) References Cited

U.S. PATENT DOCUMENTS

| | | | | |
|---|---|---|---|---|
| 6,343,004 B1 * | 1/2002 | Kuranuki | ............... | H01G 9/025 361/523 |
| 7,447,000 B2 * | 11/2008 | Cheng | .................... | H01G 9/012 361/528 |
| 7,835,139 B2 * | 11/2010 | Ozawa | .................... | H01G 9/012 361/516 |
| 2004/0085712 A1 * | 5/2004 | Tadanobu | .............. | H01G 9/012 361/523 |
| 2009/0237865 A1 * | 9/2009 | Komazawa | ............ | H01G 9/012 361/528 |

(Continued)

*Primary Examiner* — Eric Thomas
(74) *Attorney, Agent, or Firm* — Li&Cai Intellectual Property (USA) Office

(57) ABSTRACT

The instant disclosure relates to a stacked-type solid electrolytic capacitor capable of increasing welding effect and a manufacturing method of the same. The stacked-type solid electrolytic capacitor includes a plurality of solid electrolytic capacitor units, each of which has an anode part and a cathode part connected to the anode part, characterized in that the anode part is formed with at least one buffering via-hole in a welding area thereof. When each of the anode parts is compressed in a welding process, the volume of the corresponding buffering via-hole decreases accordingly. Therefore, the soldering performance of the anode part solid electrolytic capacitor is enhanced and the connection stability is increased.

13 Claims, 9 Drawing Sheets

(56) References Cited

U.S. PATENT DOCUMENTS

2011/0122544 A1\* 5/2011 Chiu ..................... H01G 9/012
361/523

\* cited by examiner

STACKED-TYPE SOLID ELECTROLYTIC CAPACITOR CAPABLE OF INCREASING WELDING EFFECT AND MANUFACTURING METHOD OF THE SAME

BACKGROUND

1. Technical Field

The instant disclosure relates to a manufacturing method of a stacked-type solid electrolytic capacitor, in particular, to a manufacturing method of a stacked-type solid electrolytic capacitor capable of increasing welding effect.

2. Description of Related Art

Capacitors are a necessary device in the electronic field, the main function thereof comprising: filtering, bypassing, rectifying, coupling, decoupling and phase inverting. Capacitors are widely used in consumer appliances, computer mother boards and related merchandise, power supplies, communication products and vehicles. Along with the development and improvement of the semiconductor processing techniques, the electronic products formed by semiconductor packages are developed based on the need of high compactness and accuracy. The electronic products must be small and compact, multi-function, and having high reliability. Conventional liquid electrolytic capacitors cannot fulfill these requirement and hence, solid electrolytic capacitors have been developed.

According to different materials and uses, the solid electrolytic capacitors can be characterized into different types. Currently, aluminum electrolytic capacitors and tantalum electrolytic capacitors are the main products in the industrial field. In addition, in order to increase the capacity of the capacitor elements, a plurality of capacitor units is stacked to be connected in parallel and packaged into a stacked-type solid electrolytic capacitor having high electric capacity (having the total capacity which is the sum of the electric capacity of each capacitor unit). However, in the welding process, the thickness of the anode parts of the capacitor units limits the possibility of success and the welding performance of the welding process, thereby affecting the number of the stack of the capacitor units and limiting the electric capacity of the products. The mechanical strength and the reliability of the products are also affected.

In addition, when the anode part is subjected to external forces during the welding process, the anode parts compress each other and cause the aluminum cores to be pushed out or splashed out. The aluminum cores which are pushed out or splashed out will occupy the space where the package was intending to fill in. Therefore, when the packaged product passes through the reflow oven under high temperature, the aluminum cores will melt and fill unoccupied space and the air-tightness property of the product will decrease.

SUMMARY

In view of the disadvantages of the existing art, the object of the instant disclosure is to provide a stacked-type solid electrolytic capacitor capable of increasing welding effect and the method for manufacturing the same, thereby avoiding the aluminum core being pushed out or splashed out during the welding process due to the compression of the anode parts of the capacitor. Therefore, the air-tightness property of the package structure is enhanced.

In order to solve the above technical problem, an embodiment of the instant disclosure provides a method for manufacturing a stacked-type solid electrolytic capacitor capable of increasing welding effect, comprising the following steps: providing a plurality of solid electrolytic capacitors, each solid electrolytic capacitor comprises an anode part and a cathode part connected to the anode part, wherein the anode part has a welding area, and at least one buffering via-hole is formed in the welding area; stacking the plurality of anode parts of the plurality of solid electrolytic capacitor units on a first conductive terminal, and stacking the plurality of cathode parts on a second conductive terminal; and applying a welding current on the plurality of anode parts through the plurality of welding areas for forming at least one welding joint between two adjacent anode parts, wherein when each anode part is compressed during a welding process, the volume of the corresponding buffering via-hole decreases accordingly.

In a preferable embodiment of the instant disclosure, the stacked-type solid electrolytic capacitor capable of increasing welding effect comprises a plurality of solid electrolytic capacitor units, each solid electrolytic capacitor unit comprises an anode part and a cathode part connected to the anode part, characterized in that the anode part has a welding area, and at least one buffering via-hole is formed in the welding area; wherein when each anode part is compressed during a welding process, the volume of the corresponding buffering via-hole decreases.

The instant disclosure at least comprises the following advantages. The method for manufacturing the stacked-type solid electrolytic capacitor employs the design of forming at least one buffering via-hole in the welding area of the anode part of each solid electrolytic capacitor unit in advance, then applying a welding current on the plurality of anode parts through the plurality of welding areas to form at least one welding joint between adjacent anode parts and hence, when the anode parts of the plurality of capacitor units are subjected to external force and compress each other during the welding process, the buffering via-hole provide stretching space for the core portion (such as aluminum core) of the anode parts to prevent the stress caused by the compression from destroying the structure of the anode part, and to avoid the core of the anode parts being pushed out or splashed out, and ensure the air-tightness of the product.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Aluminum solid electrolytic capacitor units are generally connected in parallel by stacking one above the other for forming a solid electrolytic capacitor package structure with high electric capacity. The instant disclosure provides an inventive manufacturing process and structure design for improving the welding performance of the solid electrolytic capacitor units, thereby preventing the aluminum cores from being pushed out or splashed out by the compression induced during the welding process of the anode of the capacitor.

Figure 1:
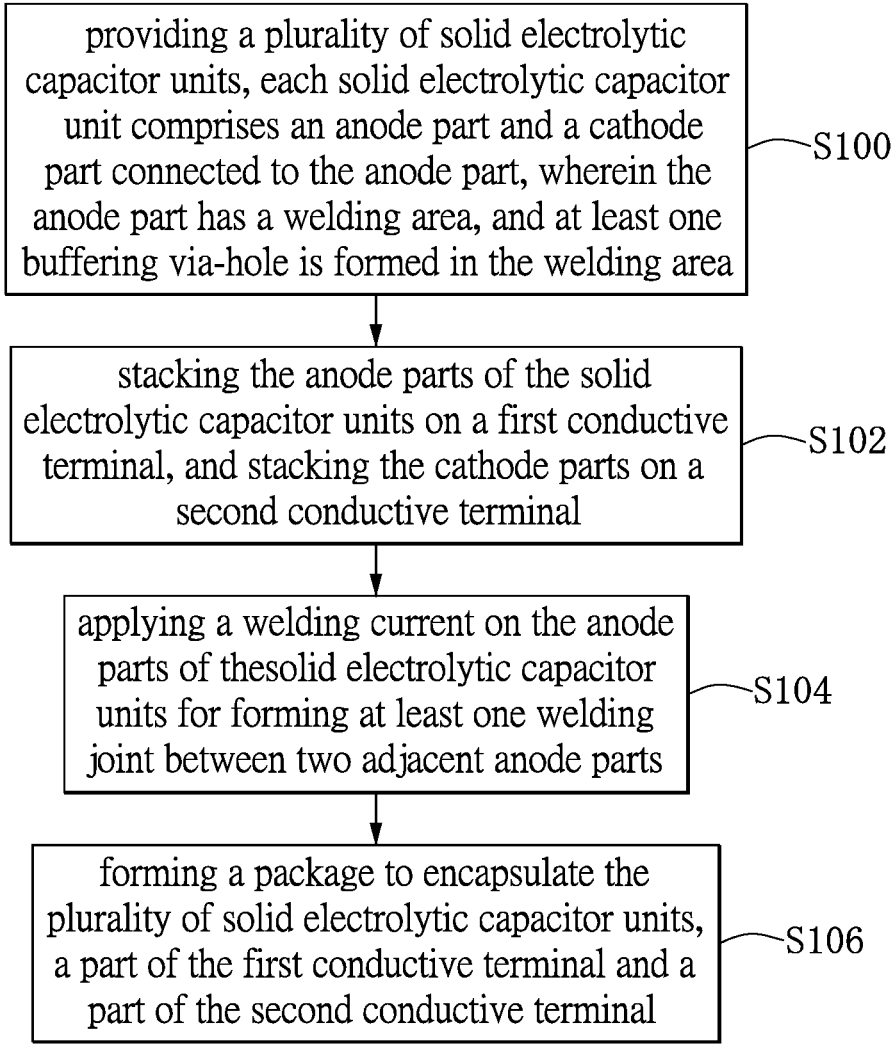
FIG. 1 is a flow chart of the method for manufacturing a stacked-type solid electrolytic capacitor capable of increasing welding effect of the first embodiment of the instant disclosure.

Reference will now be made in detail to the exemplary embodiments of the instant disclosure, examples of which are illustrated in the accompanying drawings. Wherever possible, the same reference numbers are used in the drawings and the description to refer to the same or like parts.
First Embodiment Please refer to FIG. 1. FIG. 1 is a flow chart of the method for manufacturing a stacked-type solid electrolytic capacitor capable of increasing welding effect of the first embodiment of the instant disclosure. Please refer to FIG. 2 to FIG. 7. The method for manufacturing the stacked-type solid electrolytic capacitor comprises step S100: providing a plurality of solid electrolytic capacitor units 10, each solid electrolytic capacitor unit 10 comprises an anode part 11 and a cathode part 12 connected to the anode part 11, the anode part 11 has a welding area 110, and at least one buffering via-hole H is formed in the welding area 110.

Figure 2:
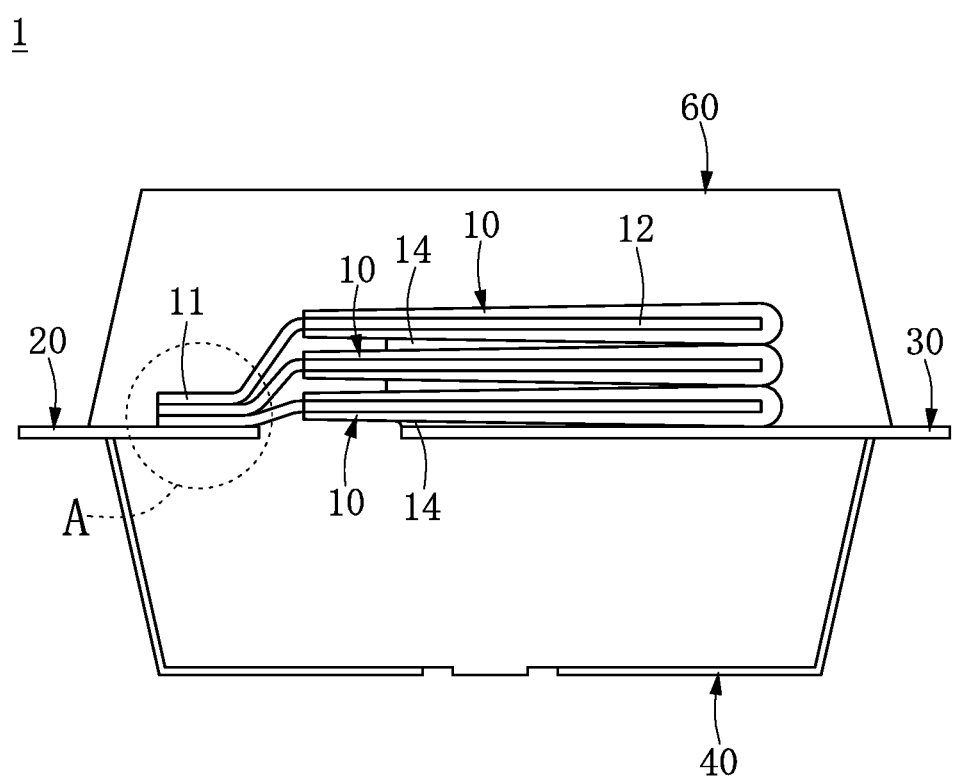
FIG. 2 is a schematic view of the structure of the stacked-type solid electrolytic capacitor capable of increasing welding effect of the instant disclosure.
Figure 3:
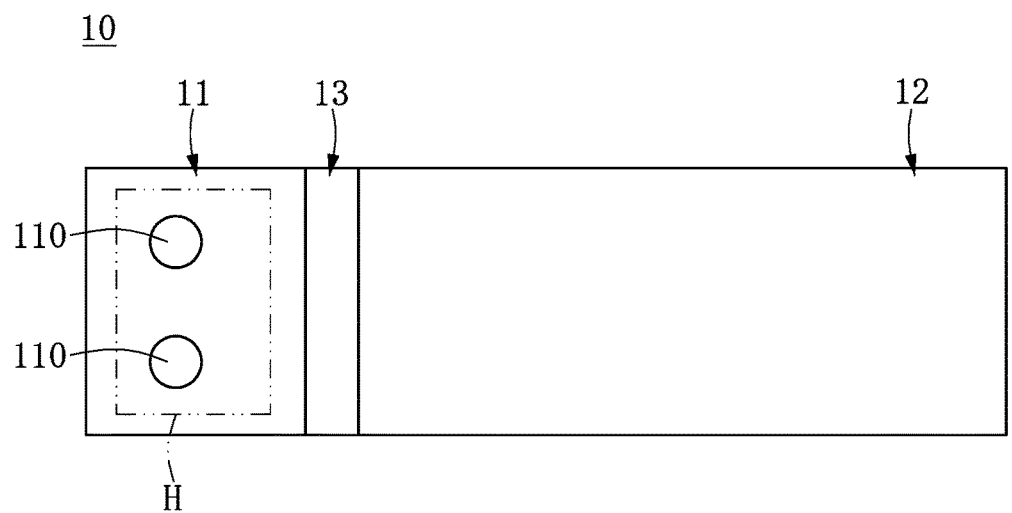
FIG. 3 is a top view of the solid electrolytic capacitor unit of the instant disclosure.
Figure 4:
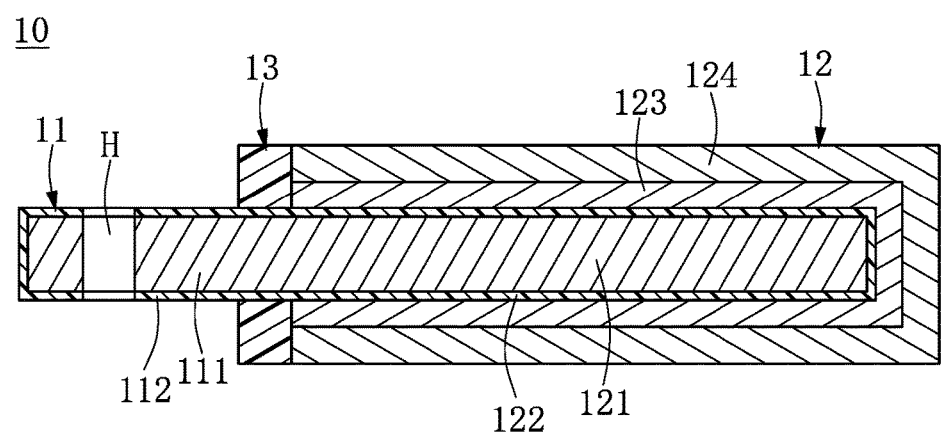
FIG. 4 is a sectional view of the solid electrolytic capacitor unit of the instant disclosure.

As shown in FIG. 2 to FIG. 4, the anode part 11 and the cathode part 12 are isolated and insulated from each other through an insulation layer 13. The anode part 11 comprises a first valve metal substrate 111 and a first corrosion layer 112 surrounding the outer surface of the first valve metal substrate 111. The cathode part 12 comprises a second valve metal substrate 121, a second corrosion layer 122 surrounding the outer surface of the second valve metal substrate 121, a conductive polymer layer 123 covering the second corrosion layer 122 and an electrode layer 124 covering the conductive polymer layer 123. The buffering via-hole H penetrating the first corrosion layer 112 and the first valve metal substrate 111 on the anode part 11 is formed by mechanical drilling or laser melting, and the aperture of the buffering via-hole H decreases from the top to the bottom hence, when the anode part 11 of the plurality of solid electrolytic capacitor units 10 is compressed by an external force during the welding process, the buffering via-hole H provides a material extending space for the core portion (such as an aluminum core) of the anode part 11. Therefore, the structure of the anode part 11 is not damaged by the stress induced by the compression and the core portion of the anode part 11 is not pushed out or splashed out, thereby ensuring the air-tightness property of the package structure.

In the present embodiment, the materials of the first valve metal substrate 111 and the first corrosion layer 112 can be aluminum, tantalum, titanium, niobium or the combination thereof, and the first corrosion layer 112 and the second corrosion layer 122 are substantially sponge-like and are formed by porous metal oxides. The conductive polymer layer 123 is formed of conductive organic polymers such as polyethylene dioxythiophene (PEDOT), polythiophene (PT), polyacetylene (PA), polyaniline (PAni) or polypyrrole (PPy). The electrode layer 124 can be a double-layered structure formed by a carbon paste layer and an aluminum paste layer (not shown), or a paste composition comprising carbon and aluminum materials.

The processes for forming the first corrosion layer 112, the second corrosion layer 122, the insulation layer 13, the conductive polymer layer 123 and the electrode layer 124 are well-known to those skilled in the art and are not described herein. The first valve metal substrate 111 and the second valve metal substrate 121 are an integrated structure, and the first corrosion layer 112 and the second corrosion layer 122 are also an integrated structure. The first valve metal substrate 111 and the first corrosion layer 112 are isolated from each other by the insulation layer 13 and form a part of the anode part 11, and the second valve metal substrate 121 and the second corrosion layer 122 are isolated by the insulation layer 13 and form a part of the cathode part 12.

Next, performing step 102: stacking the anode parts 11 of the solid electrolytic capacitor units 10 on the first conductive terminal 20, and stacking the anode parts 12 of the solid electrolytic capacitors 10 on the second conductive terminal 30. As shown in FIG. 2, the first conductive terminal 20 can be an anode terminal, and the anode parts 11 stacked one above the other can be connected to the first conductive terminal 20 in the steps following for forming a common anode; the second conductive terminal 30 can be a cathode terminal, and in the structure of the cathode parts 12 stacked one above the other, two adjacent cathode parts 12 are fixed with each other through a conductive layer (not shown), and the lowest cathode part 12 is fixed to the second conductive terminal 30 through the conductive layer for forming a common cathode. The material of the conductive layer can be silver paste. However, the instant disclosure is not limited thereto.

Figure 5:
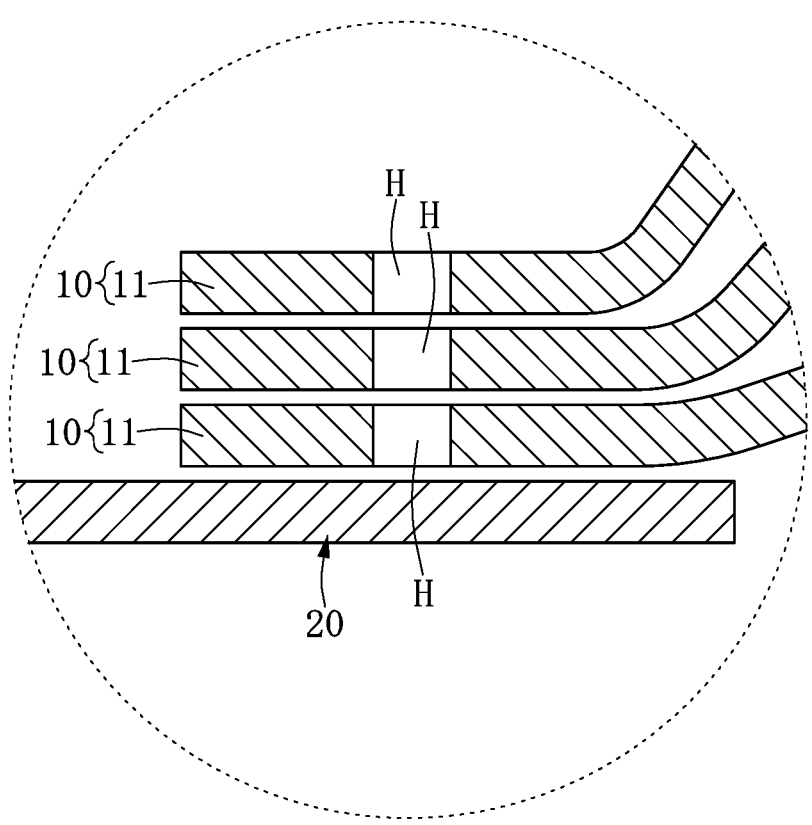
FIG. 5 to FIG. 7 are the schematic views of the manufacturing process of stacked-type solid electrolytic capacitor capable of increasing welding effect of the first embodiment of the instant disclosure.
Figure 6:
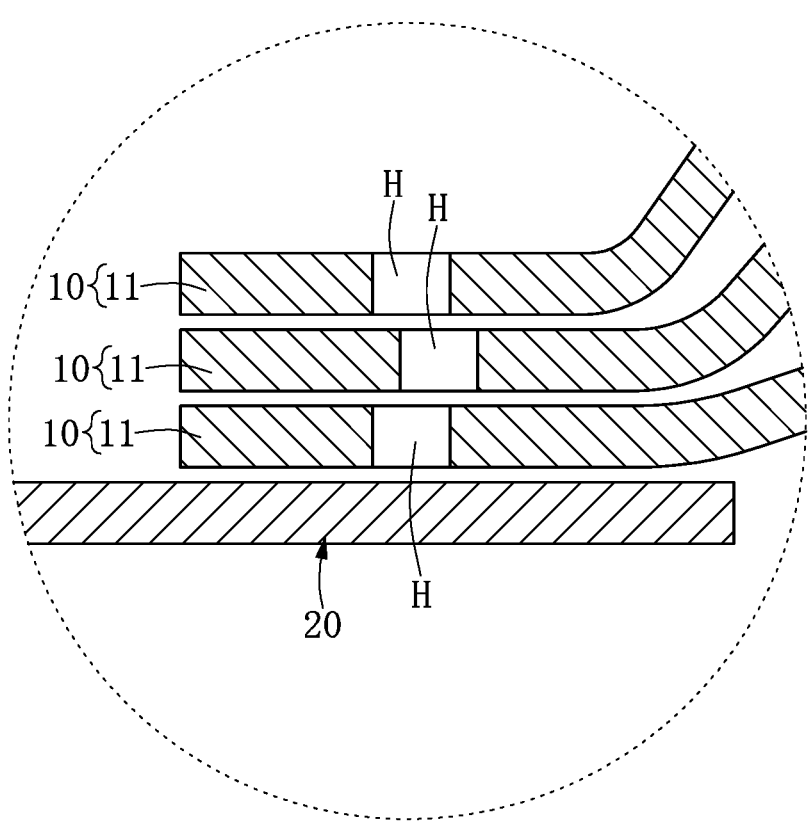

In the present embodiment, as shown in FIG. 5 and FIG. 6, between two adjacent solid electrolytic capacitor units 10, the buffering via-hole H of one of the anode parts 11 is above and corresponded to the buffering via-hole H of another anode part 11. In other words, the center axis of the buffering via-hole H of one of the anode parts 11 is overlapped with the center axis of the buffering via-hole H of another anode part 11, or the center axis of the buffering via-hole H of one of the anode parts 11 is slightly deviated from the center axis of the buffering via-hole H of another anode part 11.

Although FIG. 2 shows that the solid electrolytic units 10 are only stacked on one side of the conductive frame (such as the upper side of the conductive frame), in other embodiments, the solid electrolytic capacitor units 10 can be stacked only on the other side (such as the lower side) of the conductive frame (such as the lower side of the conductive frame), or the solid electrolytic capacitor units 10 are stacked on both sides of the conductive frame. In addition, the size, number and shape of the buffering via-hole H in the welding area 110 of each anode part 11 can be changed according to actual need. The distribution of the buffering via-holes H can be more complicated and the instant disclosure is not limited thereto.

Figure 7:
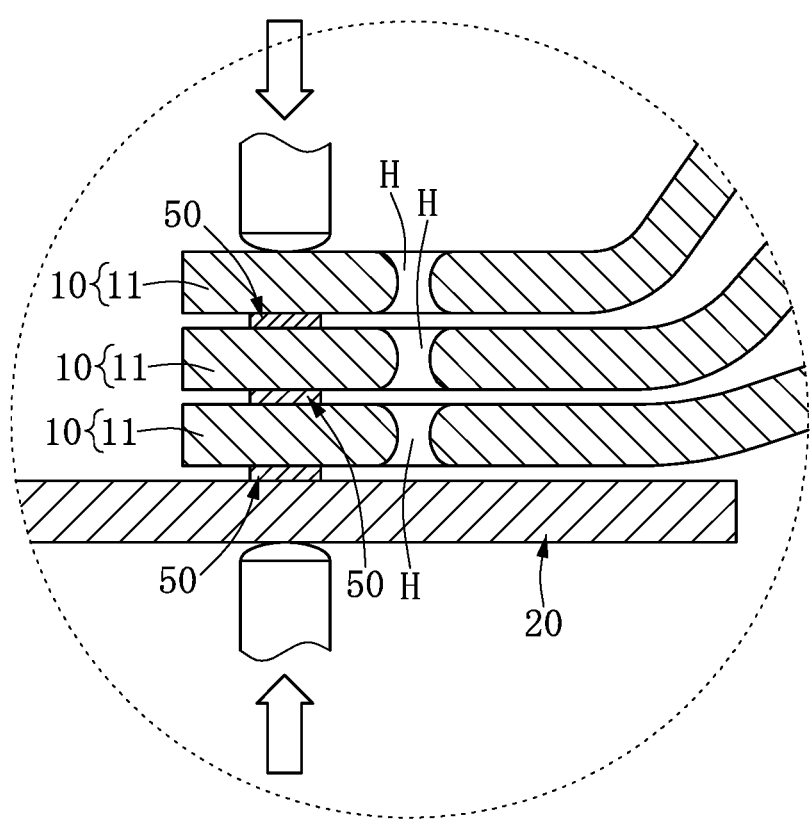

Next, performing step S104: applying a welding current on the anode parts 11 of the solid electrolytic capacitor units 10 for forming at least one welding joint 50 between two adjacent anode parts 11. In the present embodiment, the anode parts 11 of the plurality of solid electrolytic capacitor units 10 and the first conductive terminal 20 are connected by a resistance welding process. Specifically, as shown in FIG. 7, the anode parts 11 stacked one above the other and the first conductive terminal 20 are tightly pressed between two electrodes (not shown), a pressure is applied by the two electrodes, and a welding current (such as 1000 to 100000 ampere) is controlled to pass through the welding area 110 of each anode part 11 for forming the resistance heat effect, thereby melting the anode material and forming a welding interface. Afterward, a welding joint 50 is cured and formed between the two adjacent anode parts 11, and a welding joint 50 is cured and formed between the first conductive terminal 20 and the anode part 11 adjacent thereto.

In the welding process, since the material extending space provided by the buffering via-hole H receives the core portion of the anode parts 11 which is pressed out, the volume of the buffering via-hole H is reduced or even filled by the core portion. Therefore, the structure of the anode part 11 can be ensured while being pressed, thereby increasing the stability of the joint. In addition, the distribution of the welding joints 50 is varied, for example, a plurality of welding joints 50 are arranged on a straight line and have equal intervals therebetween. However, the instant disclosure is not limited thereto.

Last, performing step 106: forming a package 60 for enclosing a plurality of solid electrolytic capacitor units 10, a part of the first conductive terminal 20 and a part of the second conductive terminal 30. In practice, as shown in FIG. 2, the package 60 can be formed by a package mold (not shown) and can be formed of heat insulating materials (such as epoxy resin or silicone). The package 60 can completely encapsulate the solid electrolytic capacitor units 10 and the connecting portion (not numbered) of the first conductive terminal 20 and the second conductive terminal 30, and only expose the guiding portion (not numbered) of the first conductive terminal 20 and the second conductive terminal 30.

Please refer to FIG. 2. After step S100 to step S106 are completed, a stacked-type solid electrolytic capacitor 1 capable of increasing welding effect is produced. The stacked-type solid electrolytic capacitor 1 comprises a plurality of solid electrolytic capacitor units 10, the first conductive terminal 20, the second conductive terminal 30 and a package 60. Each solid electrolytic capacitor unit 10 comprises an anode part 11 and a cathode part 12 connected to the anode part 11, the anode part 11 has a welding area 110, at least one buffering via-hole H is formed in the welding area 110 for providing a material extending space for the core portion (such as an aluminum core) of the anode part 11 during the welding process. The volume of the buffering via-hole H decreases during the welding process correspondingly. Each anode part 11 is electrically connected to the first conductive terminal 20 for forming a common anode and each cathode part 12 is electrically connected to the second conductive terminal 30 for forming a common cathode. The package 60 encapsulates the solid electrolytic capacitor units 10, a part of the first conductive terminal 20 and a part of the second conductive terminal 30. During the use of the stacked-type solid electrolytic capacitor 1, the stacked-type solid electrolytic capacitor 1 can be connected to a circuit board, or connecting a guiding portion of the first conductive terminal 20 and the second conductive terminal 30 with a conductive layer 14 arranged on the package 60, then welding the stacked-type solid electrolytic capacitor 1 onto the circuit board by surface mounting technique (SMT).

[Second Embodiment]

Figure 8:
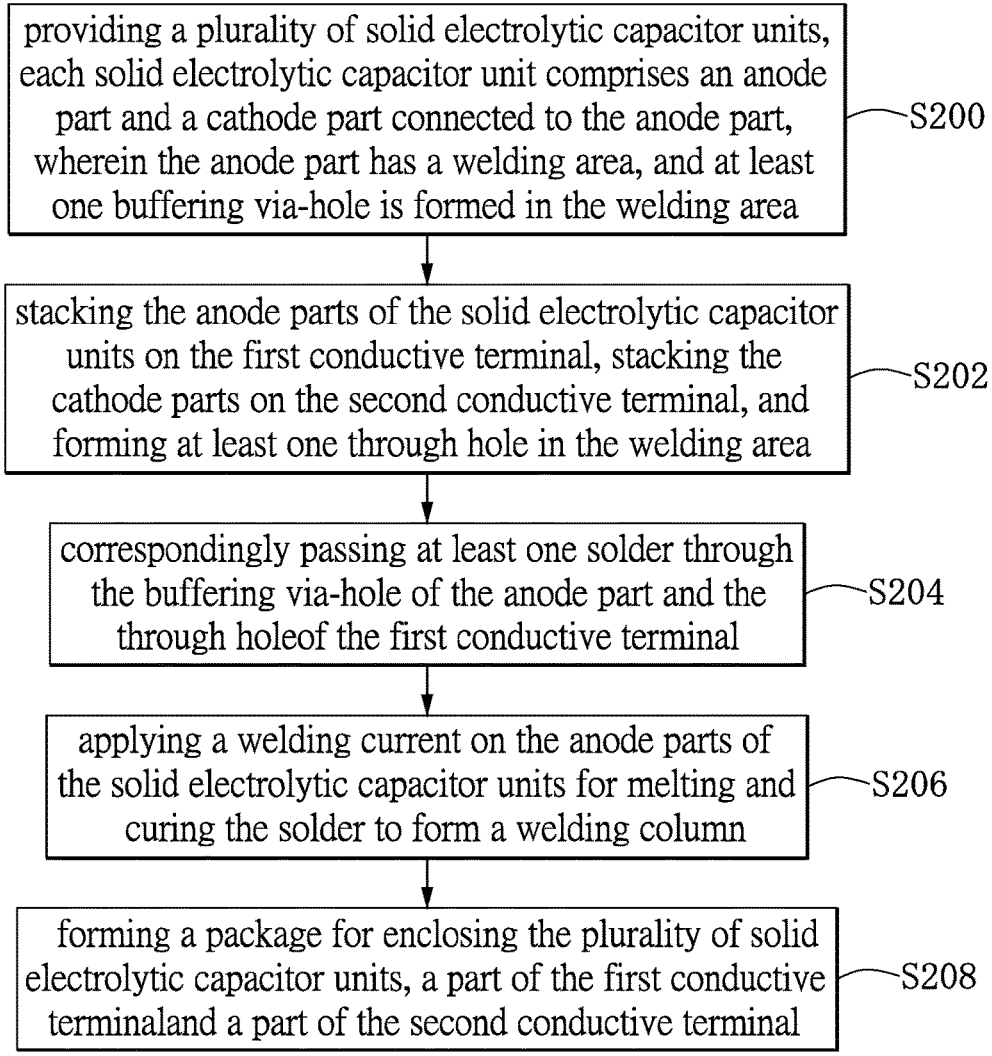
FIG. 8 is a flow chart of the method for manufacturing a stacked-type solid electrolytic capacitor capable of increasing welding effect of the second embodiment of the instant disclosure.

Please refer to FIG. 8. FIG. 8 is a flow chart of the method for manufacturing a stacked-type solid electrolytic capacitor capable of increasing welding effect of the second embodiment of the instant disclosure. The difference between the present embodiment and the first embodiment resides in the manner for welding the anode part 11 of the solid electrolytic capacitor unit 10 with the first conductive terminal 20.

Figure 9:
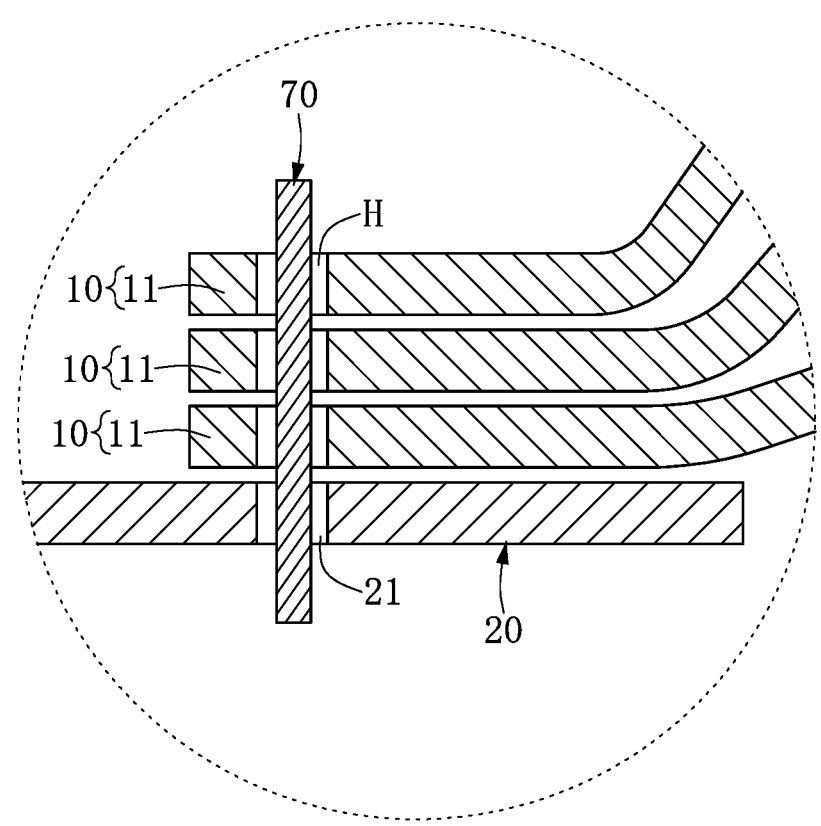
FIG. 9 and FIG. 10 are the schematic views of the manufacturing process of stacked-type solid electrolytic capacitor capable of increasing welding effect of the second embodiment of the instant disclosure.
Figure 10:
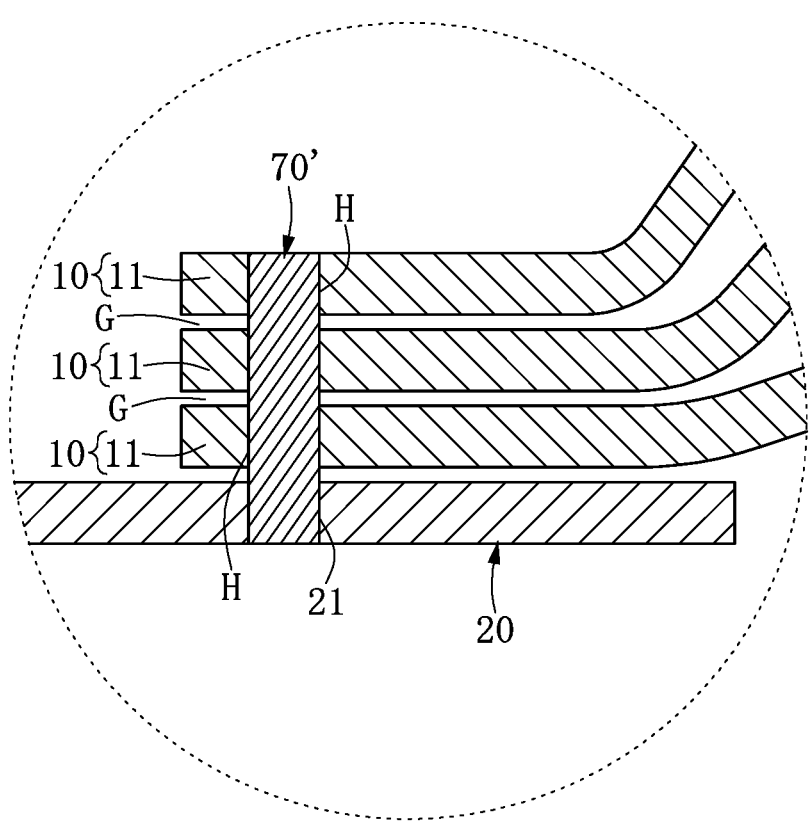

Please refer to FIG. 9 and FIG. 10. The method for manufacturing a stacked-type solid electrolytic capacitor comprises the following steps. Step 200: providing a plurality of solid electrolytic capacitor units 10, each solid electrolytic capacitor unit 10 comprises an anode part 11 and a cathode part 12 connected to the anode part 11, in which the anode part 11 has a welding area 110 and at least one buffering via-hole H is formed in the welding area 110; step S202: stacking the anode parts 11 of the solid electrolytic capacitor units 10 on the first conductive terminal 20, and stacking the cathode parts 12 on the second conductive terminal 30, in which the first conductive terminal 20 has at least one through hole 21; step S204: correspondingly passing at least one solder 70 through the buffering via-hole H of the anode part 11 and the through hole 20 of the first conductive terminal 21; step 206: applying a welding current on the anode parts 11 of the solid electrolytic capacitor units 10 for melting and curing the solder 70 to form a welding column 70'; and step S208: forming a package 60 for enclosing the plurality of solid electrolytic capacitor units 10, a part of the first conductive terminal 20 and a part of the second conductive terminal 30.

In step S200, the characteristics of the solid electrolytic capacitor unit 10 are similar to that of the first embodiment and are not described in detail herein. In step S202, as shown in FIG. 9, based on the welding process in the following step, at least one through hole 21 is formed on the first conductive terminal 20. In practice, the formation of the through hole 21 can be mechanical drilling or laser melting, the number of the through hole 21 is the same as that of the buffering via-hole H of each anode part 11, and the buffering via-hole H of the lowest anode part 11 is corresponded to the through hole 21. In other words, the center axis of the through hole 21 of the first conductive terminal 20 overlaps with the center axis of the buffering via-hole H of the lowest anode part 11.

In step S204, each set of buffering via-hole H and through hole 21 arranged in a vertical direction has a solder 70 therein, the solder 70 can be formed of tin or tin alloy. In the present embodiment, the solder 70 is tin wires; however, the instant disclosure is not limited thereto. In step S206, the anode parts 11 of the plurality of solid electrolytic capacitor units 10 and the first conductive terminal 20 are welded with each other through laser welding. Specifically, as shown in FIG. 10, a focused laser beam is used for heating (i.e., point heating) the solder 70, and the energy of the radiation would diffuse inside the solder 70 by heat conduction, thereby melting the entire solder 70. The solder 70 is then cured to form the welding column 70'. The welding column 70' can ensure the electrical and mechanical connections between the anode part 11 of the solid electrolytic capacitor unit 10 and the first conductive terminal 20. A microgap G is presented between two adjacent anode parts 11, and a microgap G is also presented between the lowest anode part 11 and the first conductive terminal 20. In step 208, the formation of the package 60 and the property thereof are similar to that of the first embodiment and are not described herein.

Since the melting point of the solder 70 made of tin or tin alloy is about 170 to 250° C., a lower output power can be used during the welding process to reduce the destruction of the heat to the equivalent series resistance (ESR). In addition, since there are microgaps G between adjacent anode parts 11, i.e., the adjacent anode parts 11 are isolated from each other by the microgaps G, the destruction induced by the leak current (LC) is reduced.

[Effectiveness of the Embodiments ]

The method for manufacturing a stacked-type solid electrolytic capacitor provided by the embodiments of the instant disclosure comprises the procedure of forming at least one buffering via-hole in the welding area of the anode part of each solid electrolytic capacitor unit, and applying a welding current through a plurality of welding areas to the plurality of anode parts, and hence, when the anode parts of the plurality of solid electrolytic capacitor units are subjected to external force and compress with each other during the welding process, the buffering via-hole provides a material extending space for the core portion (such as an aluminum core) of the anode parts, thereby preventing the structure of the anode parts from being damaged by the stress induced by the compression, and avoiding the core of the anode parts being pushed out or splashed out. Therefore, the air-tightness property of the package product is ensured.

Similarly, the method for manufacturing a stacked-type solid electrolytic capacitor provided by the embodiment of the instant disclosure comprises the procedure of forming at least one buffering via-hole in the welding area of the anode part of each solid electrolytic capacitor units, and at least one through hole in the first conductive terminal, then passing at least one solder through the buffering via-hole of the anode part and the through hole of the first conductive terminal and partially heating the solder for melting and curing the solder to form a welding column and hence, is able to prevent the structure of the anode parts from being damaged by the stress induced by the compression, and avoiding the core of the anode parts being pushed out or splashed out.

In addition, based on the above procedure design, the connection between the anode parts of the adjacent solid electrolytic capacitors is more stable, and the first conductive terminal and the adjacent anode part of the solid electrolytic capacitor are stably fixed to each other.

The above-mentioned descriptions represent merely the exemplary embodiment of the instant disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A stacked-type solid electrolytic capacitor capable of increasing welding effect, comprising a plurality of solid electrolytic capacitor units, each solid electrolytic capacitor unit including an anode part and a cathode part connected to the anode part, characterized in that each anode part has at least one buffering via-hole for receiving a pressed-out core portion thereof without being filled with any conductive material and at least one welding joint is formed between two adjacent anode parts; wherein when each anode part is compressed during a welding process, the volume of the corresponding buffering via-hole decreases.

2. The stacked-type solid electrolytic capacitor capable of increasing welding effect according to claim 1, wherein the anode parts are stacked on a first conductive terminal and electrically connected with each other to form a common anode, and the cathode parts are stacked on a second conductive terminal and electrically connected with each other to form a common cathode.

3. The stacked-type solid electrolytic capacitor capable of increasing welding effect according to claim 2, further comprising a package encapsulating the solid electrolytic capacitor units, a part of the first conductive terminal and a part of the second conductive terminal.

4. The stacked-type solid electrolytic capacitor capable of increasing welding effect according to claim 2, wherein the center axis of the buffering via-hole of one of the anode parts and the center axis of the buffering via-hole of another anode part overlap with each other.

5. The stacked-type solid electrolytic capacitor capable of increasing welding effect according to claim 2, wherein the center axis of the buffering via-hole of one of the anode parts and the center axis of the buffering via-hole of another anode part slightly deviate from each other.

6. The stacked-type solid electrolytic capacitor capable of increasing welding effect according to claim 2, wherein the first conductive terminal has at least one through hole, and the through hole and the buffering via-holes of each anode part are arranged one above the other and corresponded to each other.

7. The stacked-type solid electrolytic capacitor capable of increasing welding effect according to claim 6, wherein the center axis of the through hole and the center axes of the buffering via-holes of each anode part overlap with each other.

8. The stacked-type solid electrolytic capacitor capable of increasing welding effect according to claim 6, further comprising at least one welding column correspondingly passing through the buffering via-holes of each anode part and the through hole of the first conductive terminal for fixing the anode parts on the first conductive terminal and forming a conductive connection between the anode parts and the first conductive terminal.

9. The stacked-type solid electrolytic capacitor capable of increasing welding effect according to claim 2, wherein any two adjacent cathode parts are fixed with each other through a conductive layer.

10. The stacked-type solid electrolytic capacitor capable of increasing welding effect according to claim 2, wherein the diameter of the buffering via-holes of each anode part gradually decreases from a position far from the first conductive terminal toward a position near to the first conductive terminal.

11. The stacked-type solid electrolytic capacitor capable of increasing welding effect according to claim 1, wherein the buffering via-hole of one of the anode parts and the buffering via-hole of another anode part are arranged one above the other and corresponded to each other.

12. The stacked-type solid electrolytic capacitor capable of increasing welding effect according to claim 1, wherein each anode part comprises a first valve metal substrate and a first corrosion layer surrounding an outer surface of the first valve metal substrate, and each cathode part comprises a second valve metal substrate, a second corrosion layer surrounding an outer surface of the second valve metal substrate, a conductive polymer layer covering the second corrosion layer and an electrode layer covering the conductive polymer layer.

13. The stacked-type solid electrolytic capacitor capable of increasing welding effect according to claim 12, wherein the buffering via-hole penetrates the first valve metal substrate and the first corrosion layer.

\* \* \* \* \*